United States Patent
Bellora et al.

(10) Patent No.: US 8,150,369 B2
(45) Date of Patent: Apr. 3, 2012

(54) CHARGING MECHANISMS FOR IP MULTIMEDIA SERVICES

(75) Inventors: Mauro Bellora, Gallarate (Varese) (IT); Chiara Dotti, Milan (IT); Santiago Munoz, Madrid (ES); Stephen Terrill, Madrid (ES); Patrik Wiss, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 562 days.

(21) Appl. No.: 11/569,822

(22) PCT Filed: Jun. 3, 2004

(86) PCT No.: PCT/EP2004/051017
§ 371 (c)(1),
(2), (4) Date: Sep. 4, 2008

(87) PCT Pub. No.: WO2005/120034
PCT Pub. Date: Dec. 15, 2005

(65) Prior Publication Data
US 2008/0311883 A1    Dec. 18, 2008

(51) Int. Cl.
*H04M 11/00*    (2006.01)
(52) U.S. Cl. ............ 455/406; 455/414.1; 455/414.2; 455/414.3; 455/414.4; 455/410
(58) Field of Classification Search .............. 455/406, 455/410, 414.1–414.4
See application file for complete search history.

(56) References Cited

U.S. PATENT DOCUMENTS

| | | | |
|---|---|---|---|
| 5,960,416 A | 9/1999 | Block | |
| 6,480,588 B1 | 11/2002 | Donovan | |
| 7,634,446 B2 * | 12/2009 | Jones et al. | 705/41 |
| 2002/0106064 A1 * | 8/2002 | Bekkevold et al. | 379/114.2 |
| 2003/0078031 A1 * | 4/2003 | Masuda | 455/406 |
| 2004/0018829 A1 * | 1/2004 | Raman et al. | 455/406 |
| 2004/0082346 A1 * | 4/2004 | Skytt et al. | 455/456.3 |
| 2005/0136888 A1 * | 6/2005 | Koskinen et al. | 455/406 |
| 2005/0177469 A1 * | 8/2005 | Vallinen et al. | 705/29 |
| 2005/0262020 A1 * | 11/2005 | Karlsson | 705/41 |

FOREIGN PATENT DOCUMENTS

| | | |
|---|---|---|
| JP | H07-200687 A | 8/1995 |
| KR | 20030005091 (A) | 1/2003 |
| WO | WO 02/084985 | 10/2002 |
| WO | WO 03/003704 | 1/2003 |

* cited by examiner

*Primary Examiner* — Jinsong Hu
*Assistant Examiner* — Qun Shen

(57) ABSTRACT

A method of reserving credit for a mobile subscriber in respect of an IP multimedia service. The method comprises, following initial registration of the subscriber to the IP Multimedia service but prior to invocation of an IP Multimedia service, using the early session establishment procedure to reserve a credit amount at a charging control node and to notify an IP Multimedia Serving Element of the credit reservation, whereupon, at invocation of said IP multimedia service, the IP Multimedia Serving Element is able to proceed immediately with the session establishment.

8 Claims, 6 Drawing Sheets

CHARGING MECHANISMS FOR IP MULTIMEDIA SERVICES

FIELD OF THE INVENTION

The present invention relates to charging mechanisms for IP Multimedia services and which are applicable in particular, though not necessarily, to Push-to-talk over Cellular services.

BACKGROUND TO THE INVENTION

IP Multimedia services provide a dynamic combination of voice, video, messaging, data, etc. within the same session. By growing the numbers of basic applications and the media that it is possible to combine, the number of services offered to the end users will grow exponentially, and the inter-personal communication experience will be enriched. This will lead to a new generation of personalized, richer multimedia communication services.

IP Multimedia Subsystem (IMS) is the technology defined by the Third Generation Partnership Project (3GPP) to provide IP Multimedia services over 3G mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) and Service Delivery Protocol (SDP) to set up and control calls or sessions between user terminals (or user terminals and web servers). FIG. 1 illustrates schematically how the IMS fits into the mobile network architecture.

Existing cellular telephone network operators have recently experienced tremendous growth in the numbers of subscribers choosing to use so-called "prepaid" subscriptions; that is where subscribers deposit an amount of cash (the credit balance) with their operators, which is consumed by the subsequent use of services by the subscribers. It is anticipated that the prepaid subscription option will prove equally popular with the users of IPMM services. Indeed, the provision of pre-paid services is likely to be a must for widespread take-up of IPMM services.

When online/real-time charging mechanisms are used (as for prepaid users), the general rule would be for the IPMM Serving Element (SE) providing access to the requested service, to request credit authorisation before granting a mobile node access to the requested service. However, this would inevitably increase the session set-up time for prepaid subscribers, as the IPMM SE must conduct a credit authorization transaction with a Charging Control Node, also referred to as a Prepaid System (PPS) or Online Charging System (OCS).

For some IPMM/IMS based services the session set-up time is critical. This applies for example to so-called Push-to-talk over Cellular (PoC) services such as Instant Personal Talk and Ad-hoc Instant Group Talk, where the originating party pushes the PoC button on his/her terminal to invite one or more users to a walkie-talkie type session, and expects to be immediately in contact with the invited party/parties (as opposed to the traditional call, ring, answer based telephony services). The introduction of the prepaid payment mechanism as currently proposed is likely to result in a degradation of the PoC session set-up time to an unacceptable level, or may lead to a sub-optimal user experience due to the additional delay produced by the credit authorisation phase.

SUMMARY OF THE INVENTION

It is an object of the invention to obviate the effects of prepaid payment mechanisms on actual and perceived subscriber service levels.

According to a first aspect of the present invention there is provided a method of reserving credit for a mobile subscriber in respect of an IP Multimedia service, the method comprising:

following initial registration of the subscriber to the IP Multimedia service but prior to invocation of an IP Multimedia service, using the early session establishment procedure to reserve a credit amount at a charging control node and to notify an IP Multimedia Serving Element of the credit reservation, whereupon, at invocation of said IP Multimedia service, the IP Multimedia Serving Element is able to proceed immediately with the session connection.

It will be appreciated that the early session establishment procedure will comprise an exchange of appropriate messages between the IP Multimedia Serving Element and the charging control node. The messages may satisfy the requirements of the DIAMETER protocol.

The early session establishment procedure will also typically be used for service negotiation purposes (e.g. exchange of media address and codec types) between the subscribers terminal (UE) and the IMS Server.

The early session establishment procedure may be triggered automatically following registration of the subscriber to the IP multimedia service, or may be triggered, for example, by the subscriber/end-user activating a particular IP Multimedia service at his/her terminal.

The invention is applicable in particular, though not necessarily, to Push-to-talk over Cellular (PoC) IP Multimedia services.

The method may comprise, at one of the IP Multimedia Serving Element and the charging control node, estimating an amount of credit appropriate to the IP Multimedia service. Preferably, this estimate is carried out at the charging control node.

In the case of a prepaid subscriber, said charging control node will be a prepaid system (PPS) server located in the subscriber's home network.

Preferably, the method comprises, at invocation of the IP Multimedia service, performing a credit authorisation procedure between the IP Multimedia Service Element and the charging control node based upon the actual service that has been requested/invoked to establish a revised credit amount. The estimated credit amount is replaced by the revised credit amount.

According to a second aspect of the present invention there is provided a method of operating an IP Multimedia Serving Element arranged to facilitate access to an IP Multimedia service by mobile subscribers, the method comprising:

following initial registration of a subscriber to the IP multimedia service but prior to initiation of the IP multimedia session, initiating an early session establishment procedure with a charging control node to reserve a credit amount at the charging control node.

According to a third aspect of the present invention there is provided a method of operating a charging control node arranged to control subscriber access to IP Multimedia services, the method comprising:

participating in an early session establishment procedure following initial registration of a subscriber to the IP Multimedia service but prior to invocation of the IP multimedia service, the charging control node estimating an appropriate credit amount to be reserved for a future session.

DETAILED DESCRIPTION OF CERTAIN EMBODIMENTS OF THE INVENTION

In an IP Multimedia Subsystem (IMS) session there can be a number of users that are subscribers of several different IMS operators. In any generally applicable charging procedure, each of the IMS operators should be able to charge their own subscribers independently, according to their own charging policy. That is to say that different charging models may be applied in different networks for the same IMS session. Moreover, different charging models may be applied to different sets of subscribers for the same IPMM service/feature, within a given operator's network.

According to 3GPP R5 TS 32.225 and TS 32.200 and IETF DCC (Internet draft "Diameter Credit-Control Application), two scenarios for IMS online charging are distinguished:

1) "One-Time Event with Direct Debiting" scenario. "Immediate Event Charging" model in 3GPP. "Credit Authorization with Direct Debiting" model in IETF DCC.

2) "Session-based Credit Control" scenario. "Event Charging with Unit Reservation" model in 3GPP. "Credit Authorization with Money Reservation" model in IETF DCC.

In both models the IPMM Serving Elements (IPMM SE), i.e. credit control client, request credit authorization from the Online Charging System (OCS)/Prepaid System (PPS), i.e. the credit control server, prior to allowing any service to be delivered to the end user. The Session-based Credit Control scenario is considered to be more appropriate for most IPMM services, and it is the scenario considered here.

Session-based Credit Control is a process in which the PPS rates a request from a IPMM SE, reserves a suitable amount of money from the user's account, and notifies the IPMM SE of the corresponding amount of credit resources. Of course, "credit resource" may not imply actual monetary credit: credit resources may be granted in the form of units (e.g. data volume or time) to be metered. Upon reception of a successful credit authorisation answer with a certain amount of credit resources, the IPMM SE allows service delivery to the end user and starts monitoring the usage of the granted resources. When the credit resources granted to the end user have been consumed or the service has been successfully delivered or terminated, the IPMM SE reports back to the PPS the used amount, and the PPS deducts the used amount from the users account (the PPS may perform rating and make a new credit reservation if the service delivery is continuing). This process includes first interrogation, possible intermediate interrogations, and a final interrogation. Both IPMM SE and PPS are required to maintain credit control session state information.

Figure 1:
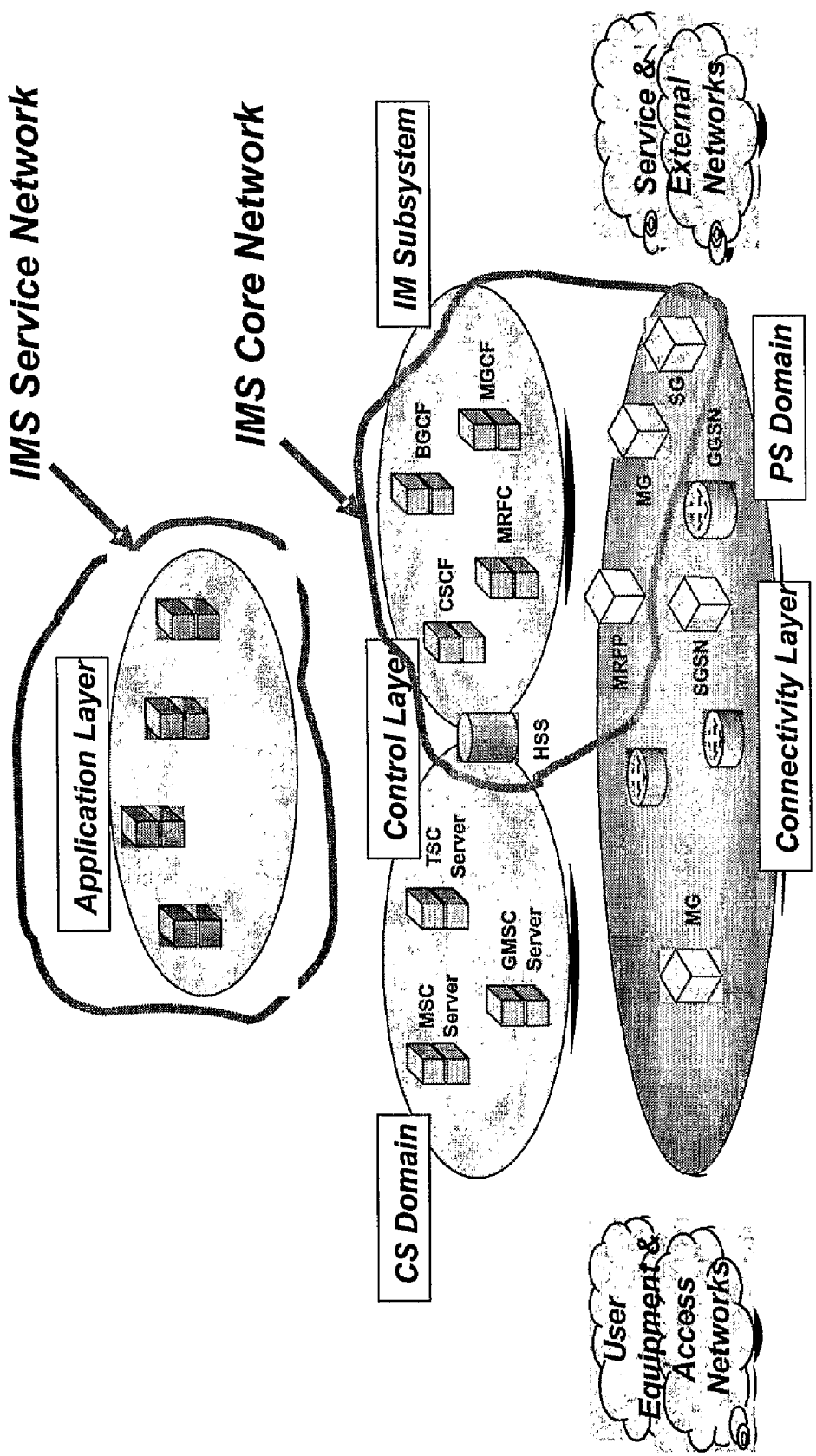
FIG. 1 illustrates schematically a mobile network architecture incorporating an IP Multimedia Subsystem.
Figure 2:
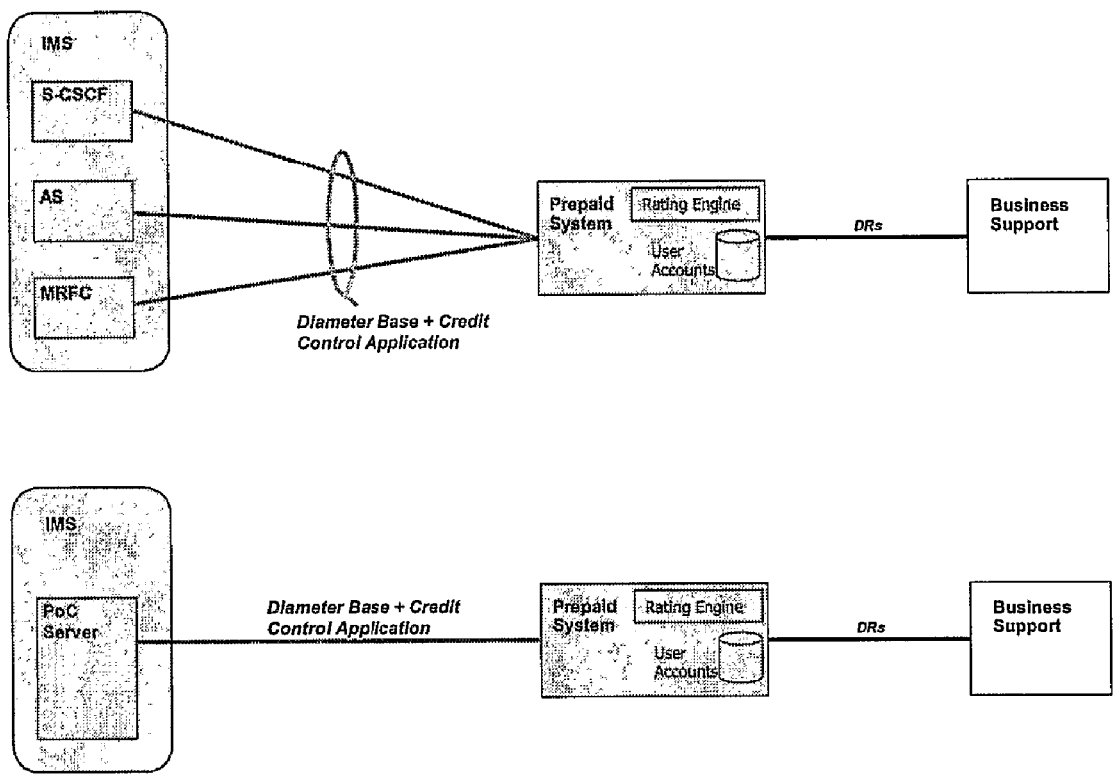
FIG. 2 illustrates a simplified logical online charging architecture for an IPMM services.

The upper diagram of FIG. 2 illustrates a general online charging architecture for IPMM, whilst the lower diagram illustrates a simplified architecture for PoC. The Online Charging System (OCS)/Prepaid System (PPS) provides the charging control function for a real-time charging mechanism. The Prepaid System includes the Account Balance Manager and the User Accounts, the Rating Engine and the Tariff Information. The Rating Engine provides rating values for sessions/services or events not priced at source, i.e. for which serving elements do not have a price. For online charging, the IPMM SEs which may provide charging input to the PPS, are the Serving-Call Session Control Function (S-CSCF), the Multimedia Resource Function Control (MRFC), and the Application Server (AS). For Push-to-talk over Cellular (PoC) the SE providing charging input to the PPS is the PoC Server (which embraces MRF and AS functionality). The interface between the IPMM SEs and the PPS is based on the Diameter Base Protocol (DBP) and the Diameter Credit Control Application (DCC) as is being defined by 3GPP in Release 5 and 6.

Figure 3:
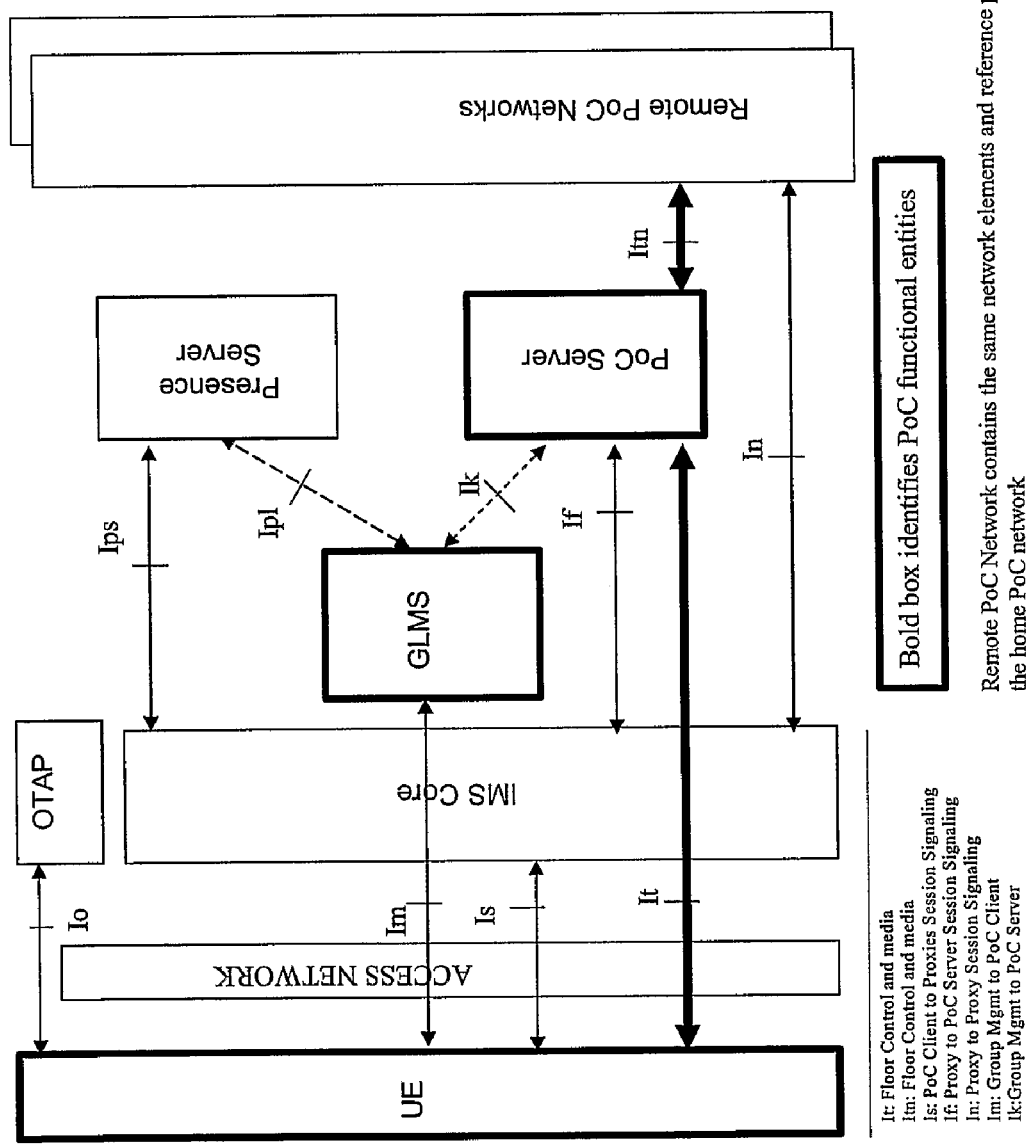
FIG. 3 shows the PoC Release 2 architecture.

FIG. 3 shows the PoC Release 2 architecture, where the PoC functional entities are drawn with solid lines. The following interfaces are shown in FIG. 3:

It: Floor control and media
Itn: Floor control and media
Is: PoC client to proxies session signalling
If: Proxy to PoC server session signalling
In: Proxy to proxy session signalling
Im: Group management server to PoC client
Ik: Group management server to PoC server
Io: OTAP server to PoC client.

The PoC architecture has two PoC Server functions, Controlling PoC Server function/logical entity and Participating PoC Server function/logical entity. In each PoC talk session there is only one Controlling PoC Server, whereas there can be one or more Participating PoC Server. The Controlling PoC Server handles the centralized tasks that should not be handled by more than one PoC Server in the PoC talk session. A PoC Server behaves as either a Controlling PoC Server or a Participating PoC Server, as selected on a per PoC talk session basis.

A PoC Server realisation (i.e. physical entity/node) may behave as both a Controlling PoC Server and a Participating PoC Server at the same time and for the same PoC talk session. In the case of Instant Personal Talk and Ad-hoc Instant Group Talk, the PoC Server of the inviting user is the Controlling PoC Server. In case of Chat Group Talk and Instant Group Talk, the Controlling PoC Server is the PoC Server owning/hosting the group identity (the Global Group Identity). Further details of these PoC services are given in the Appendix below.

As has been outlined above, the conventional approach to credit reservation for PoC sessions is likely to result in significant session set-up delays. An alternative method of reserving credit for PoC delay sensitive services/features (i.e. Instant Personal Talk and Ad-hoc Instant Group Talk) is proposed here which maintains all prepaid characteristics (i.e. operator credit control, end-user real-time spending control). This method makes use of the so-called "early session" establishment procedure to reserve credit for PoC features with critical session set-up time before the end-user initiates a talk session, i.e. before the actual PoC feature is invoked. The early session establishment procedure is used for service negotiation purposes (e.g. communication of IP address/port number for RTP/RTCP, and codec types) between the UE and his/her home PoC Server. The early session may be established immediately following IMS registration or at any later point in time. The early session establishment procedure is defined in the PoC Release 2.0 architecture.

At early session establishment, the PoC Sever performs credit-reservation towards the PPS (by sending a Diameter Accounting Request (ACR), with Accounting-Record-Type=START), before continuing with the processing of the early session establishment request. The PPS tentatively rates the service (at this stage it is unknown which PoC feature will be invoked by the user at a later time) and, if the user's credit balance is sufficient, the PPS reserves a suitable amount of money from the user's account and returns the corresponding amount of credit units to the PoC Sever (in a Diameter ACA message, with Accounting-Record-Type=START). Upon successful credit reservation, the PoC Server continues processing the early session establishment request. This credit authorization phase is not particularly time sensitive, as the PoC feature has not yet been invoked.

In the event that the credit reservation is unsuccessful (e.g. the user's credit balance is exhausted), the PPS initiates the Immediate Service Termination procedure by returning a failure indication to the PoC Server (in a Diameter ACA message, with: Result-Code=DIAMETER_END_USER_SERVICE_DENIED).

The PoC Server returns a SIP error indication to the serving IMS Core. An error indication is returned to the UE and end-user.

As already mentioned, when credit is reserved at early session establishment, the PoC Sever is not aware yet of which PoC feature will be invoked at a later time, or indeed whether the UE performing the early session establishment procedure will be used by the origination (session-owner) or terminating (participant) end-user. Thus, at early session establishment the PoC Sever may only provide limited input for rating to the Prepaid System. At session connection (i.e. the actual PoC feature invocation/set-up stage), the PoC Sever processes the service request immediately, by relying on the previously reserved credit. The PoC Server is now able to provide precise input for rating to the PPS (in a Diameter ACR message, with Accounting-Record-Type=INTERIM). This credit authorization phase is again not particularly time sensitive because an estimated credit amount has been already reserved, reducing the risk to the service provider. The service invocation can be processed immediately, while in parallel a second credit authorization is carried out to refine the rating.

Figure 4:
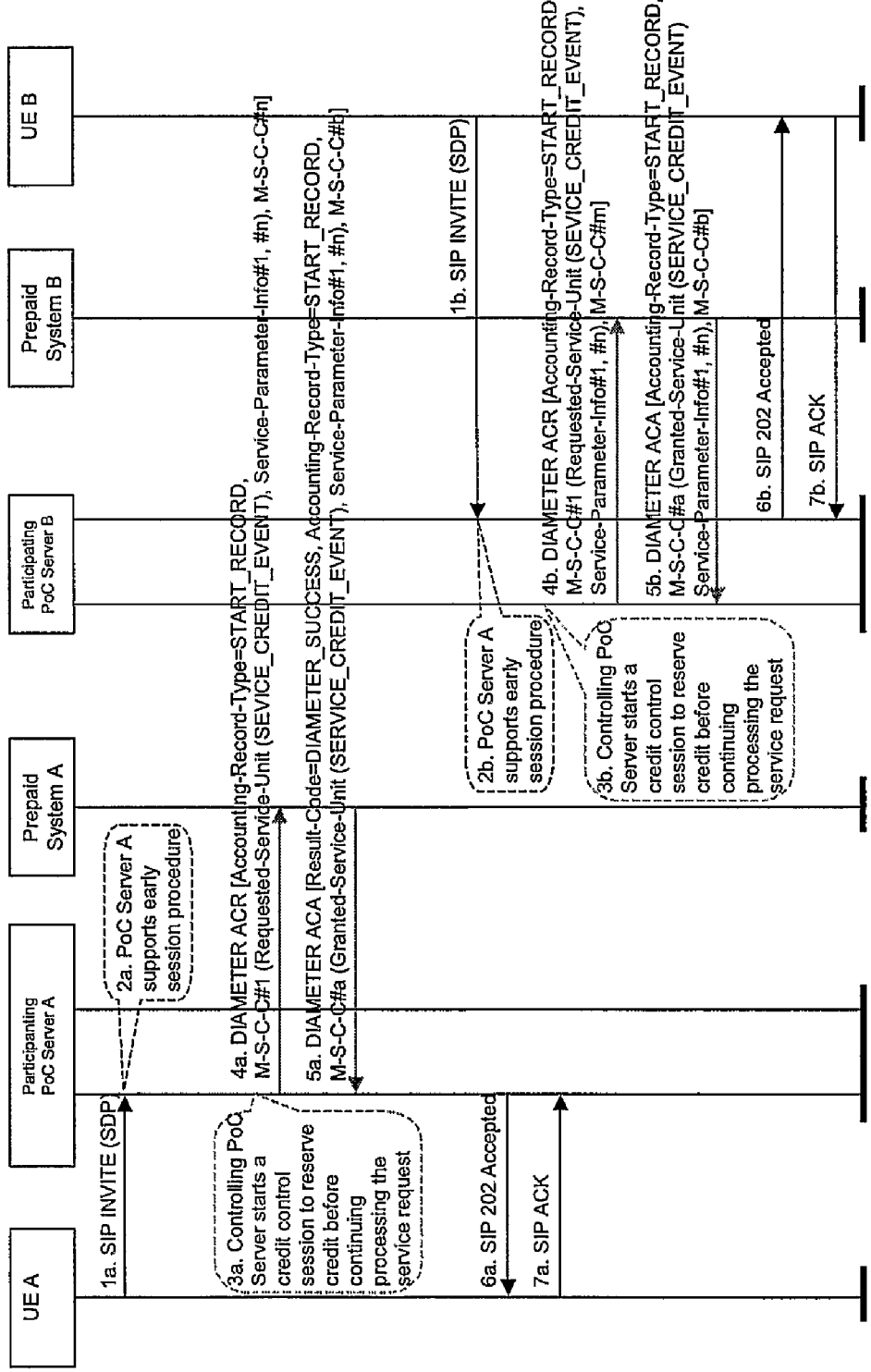
FIG. 4 shows signalling associated with the early session establishment procedure for PoC Instant Personal Talk.

FIG. 4 illustrates the signaling associated with the early session establishment procedure when used for advanced credit reservation with the Instant Personal Talk feature. This scenario provides for an early session establishment procedure at both sides. (NB. the signalling flow does not show the originating and terminating IMS Core.) The various signalling steps are as follows:

Network-A Early Session Establishment

1a. UE-A begins early session establishment (immediately after initial IMS registration or at some later point in time, e.g. when the user activates the Instant Talk service from the UE) by sending a SIP INVITE towards PoC Server A, via IMS Core A (i.e. UE sends SIP INVITE to IMS Core A). The IMS Core A returns a SIP 100 "Trying" to UE A. The IMS Core A detects an originating trigger and as a result sends the SIP INVITE to PoC Server A. The SIP INVITE includes:
Request-URI user part set to pre-configured string "Ad-hoc-GroupRequest" (the string is configured in the UE)
Accept-Contact including the feature tag "+g.poc.talkburt=TRUE"
To=URI user part set to pre-configured string "Ad-hocGroupRequest"
From=inviting user's Public User Identity
Message body with Content Type "application/sdp" containing an SDP Offer 1

2a. PoC Server A checks that early session is supported. For the purpose of this scenario it is assumed that early session is supported. PoC Server A may send a SIP 100 Trying to IMS Core A.

Charging in Network-A, First Interrogation

3a. The Controlling PoC Server starts a credit-control session towards user-A's home Prepaid System A, while continuing processing the received session set-up request/SIP INVITE. The Prepaid System A is identified by the ECF address downloaded as part of user A profile from Home Subscriber System (HSS) to the S-CSCF in IMS Core A at IMS user A registration time and transferred in the SIP INVITE from the S-CSCF in IMS Core A to PoC Server A.

4a. The Controlling PoC Server sends a Diameter ACR to Prepaid System A.

The Diameter ACR includes:
Accounting-Record-Type=START_RECORD
Subscription-Id (Type=END_USER_SIP_URL, Data='user-A SIP URI')
M-S-C-C (#1)
  Service-Parameter-Info(Type=ExtensionNumber1, Value=POC_ANY_TALK_SESSION)
  Service-Parameter-Info (Type=ExtensionNumber2, Value=session–owner)
  Requested-Service-Unit (Type=SERVICE_CREDIT_EVENT, Value='pre-configured value')
  Service-Parameter-Info (Type=ExtensionNumberA, Value=e.g. "total time session is up"
M-S-C-C (#2)
  Service-Parameter-Info (Type=ExtensionNumber1, Value=POC_ANY_TALK_SESSION)
  Service-Parameter-Info (Type=ExtensionNumber2, Value=session–owner)
  Requested-Service-Unit (Type=SERVICE_CREDIT_EVENT, value='pre-configured value')
  Service-Parameter-Info (Type=ExtensionNumberC, Value=e.g. "number of distributed talk bursts"
M-S-C-C (#n)
  Service-Parameter-Info (Type=ExtensionNumber1, Value=POC_ANY_TALK_SESSION)
  Service-Parameter-Info (Type=ExtensionNumber2, Value=session–participant)
  Requested-Service-Unit (Type=SERVICE_CREDIT_EVENT, Value='pre-configured value')
  Service-Parameter-Info (Type=ExtensionNumberBB, Value=e.g. "number of sent and/or received talk burst"

NOTE: in this example three M-S-C-C AVPs are included/shown. In general, several M-S-C-C AVPs may be included, one for each measurement method supported by the IPMM SE for the concerned service-type and party-role combination.

5a. Prepaid System—A tentatively rates the service (it is unknown at this stage whether any future requested service will be Instant Personal Talk or Ad-hoc Instant Group Talk), based on the contents of the received Service-Parameter-Info, makes a credit-reservation from the end-user's account (that covers the anticipated cost of the service) and returns a Diameter ACA message to the PoC Server. For the purpose of this scenario the user's credit balance is assumed to be sufficient. The Diameter ACA includes:
Result-Code=DIAMETER_SUCCESS
Accounting-Record-Type=START_RECORD Accounting-Interim-Interval ('value set by the Prepaid System')
Subscription-Id (Type=END_USER_SIP_URL, Data='user-A SIP URI')
M-S-C-C (#a)
   Service-Parameter-Info (Type=ExtensionNumber1, Value=POC_ANY_TALK_SESSION)
   Service-Parameter-Info (Type=ExtensionNumber2, Value=session–owner)
     Granted-Service-Unit
      (Type=SERVICE_CREDIT_EVENT, Value='Prepaid System sets Granted-Service-Unit value=Requested-Service-Unit value')
   Service-Parameter-Info (Type=ExtensionNumberC, Value=e.g. "number of distributed talk bursts"). Note: it is the charging model in force if the user will later take the role of session-owner.
M-S-C-C (#b)
   Service-Parameter-Info (Type=ExtensionNumber1, Value=POC_ANY_TALK_SESSION)
   Service-Parameter-Info (Type=ExtensionNumber2, Value=session–participant)
   Granted-Service-Unit
     (Type=SERVICE_CREDIT_EVENT, Value='Prepaid System sets Granted-Service-Unit value=Requested-Service-Unit value')
   Service-Parameter-Info (Type=ExtensionNumberBB, Value="sent talk burst"). Note: it is the charging model in force if the user will later take the role of session-participant.

The Controlling PoC Server A starts monitoring the usage of the granted-service-units.

Early Session Establishment Proceeds

6a. PoC Server A sends a SIP 202 Accepted to UE A via IMS Core A. The SIP 202 Accepted includes:
Contact, containing the transient ad-hoc group identifier generated by the Controlling PoC Server
Message body with Content Type "application/sdp" containing an SDP Answer 1

7a. UE A sends a SIP ACK to PoC Server A, via IMS Core A.

Network-B Early Session Establishment and Charging First Interrogation

In parallel to steps 1a through 7a in Network A, steps 1b though 7b take place in Network B (involving User B, UE B, IMS Core B, PoC Server B, Prepaid System B).

Early session—Connection

Figure 5:
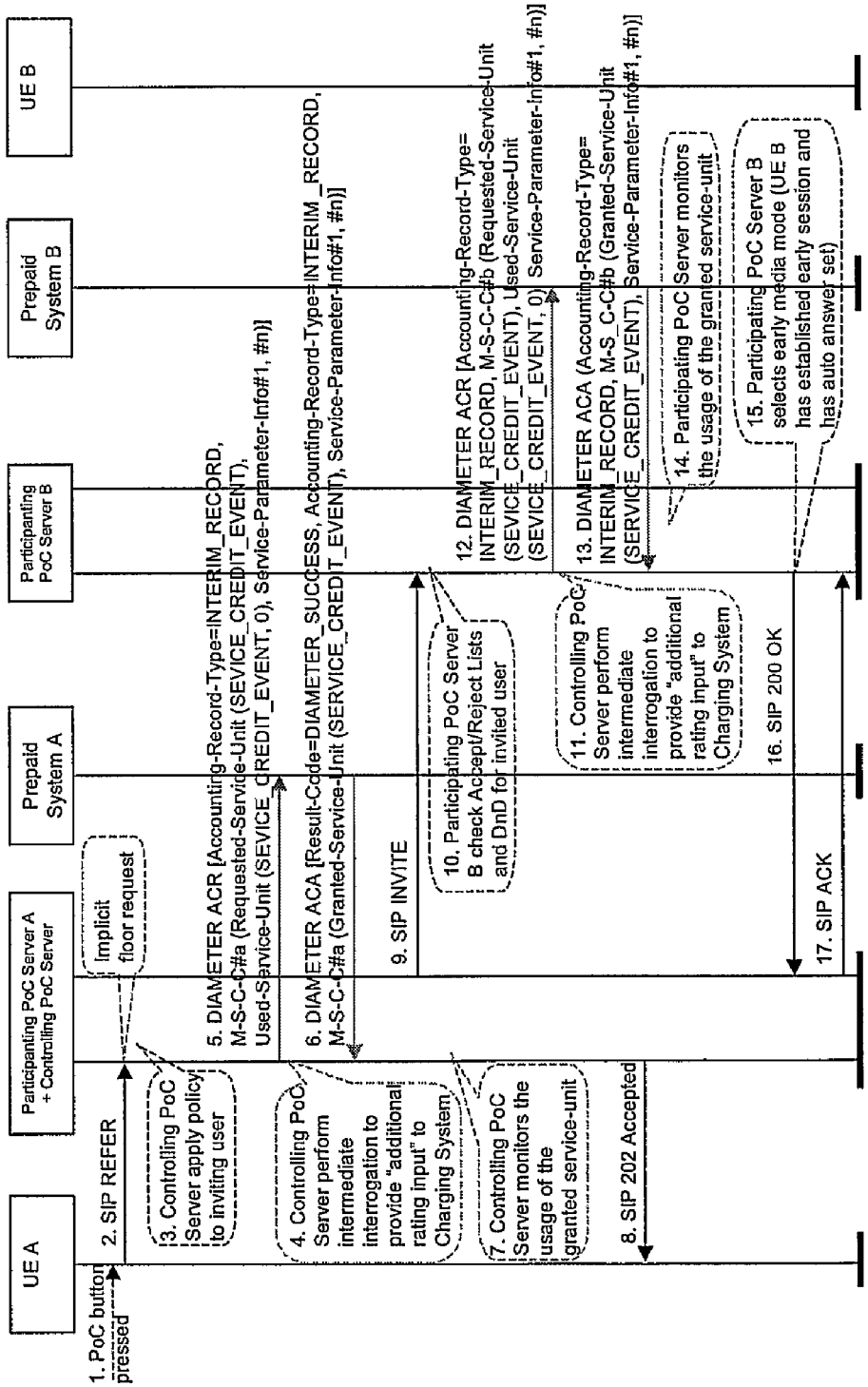
FIGS. 5 and 6 show signalling associated with the session connection procedure, following early session establishment, when the service is actually invoked.
Figure 6:
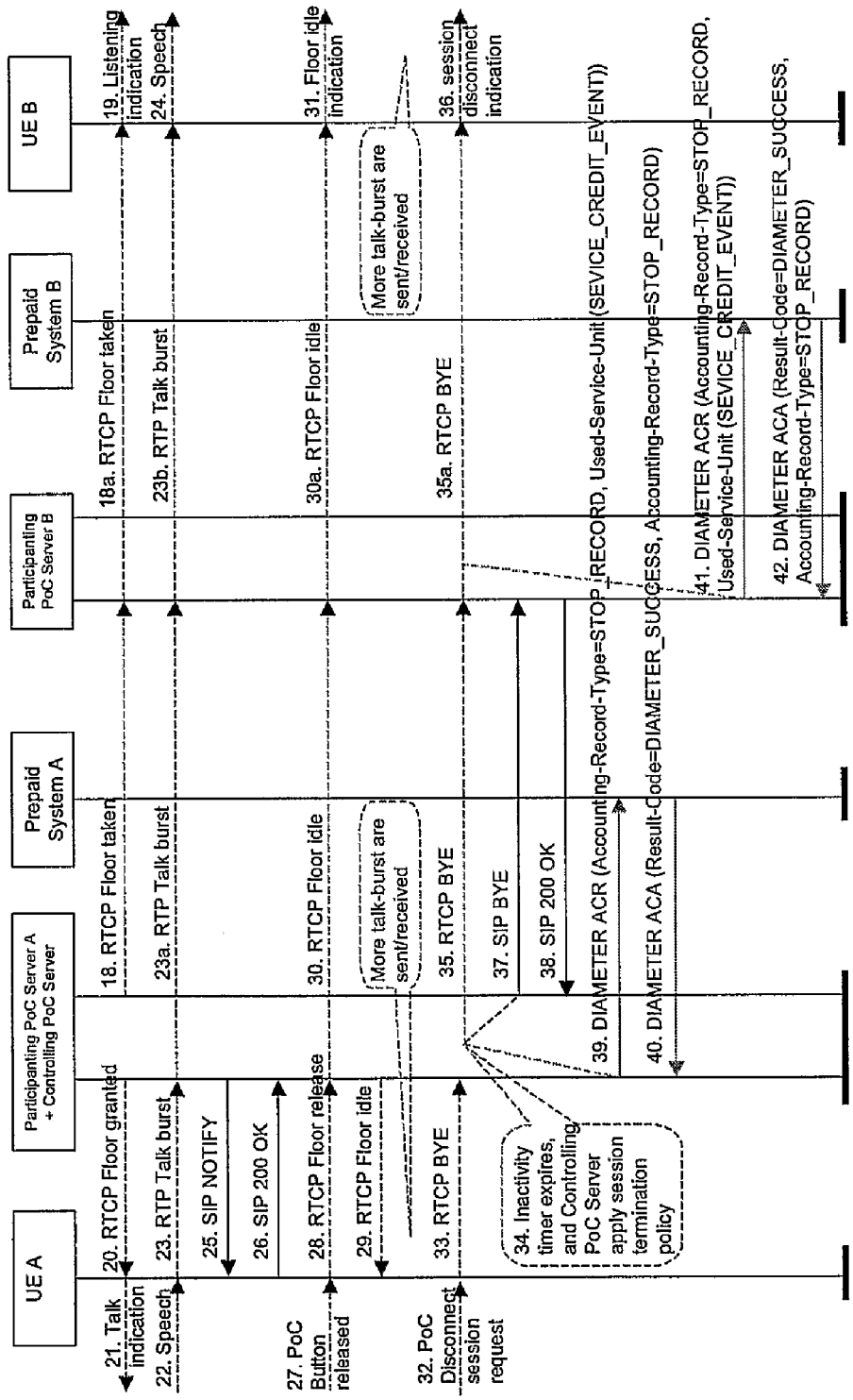

After completion of the early session establishment procedure illustrated in FIG. 4, the connection procedure is initiated by a subscriber (UE-A in this case). FIGS. 5 and 6 illustrates signalling associated with an Instant Personal Talk establishment (i.e. connection set-up). Again, the signalling flow does not show the originating and terminating IMS Core. The signalling steps are as follows.

Connection Set-Up with Early Session

1. The end-user at UE A, subscriber of Network A, presses the PoC button to initiate an Instant Personal Talk session with end-user at UE B, subscriber of Network B.

2. UE-A sends a SIP REFER to PoC Server A, via IMS Core A. The SIP REFER includes:
Refer-To: invited users Public User Identity (i.e. SIP URI or E.164 number)

3. The originating Participating PoC Server A recognizes the session type as Instant Personal Talk, based on the information in the SIP REFER (i.e. one Public User Identity).

The originating Participating PoC Server A takes the function of Controlling PoC Server. The originating Participating PoC Server function is logically co-located with the Controlling PoC Server function. That is, for Instant Personal Talk, the PoC Server assigned to the inviting user is the Controlling PoC Server.

The Controlling PoC Server shall:
Authorizes the inviting user to the talk session;
Interpret the SIP REFER as an implicit subscription request to a refer event package for each outgoing SIP INVITE/REFER (i.e. the inviting UE shall receive information about invited users' final SIP response in a SIP NOTIFY); and
Interpret the SIP REFER as an implicit "floor request"

Charging in Network-A. Intermediate Interrogation

4. The controlling PoC Server performs an intermediate interrogation to provide new/additional rating input to Charging System A, i.e. the Controlling PoC Server now has knowledge that the session is of type Instant Personal Talk.

5. The Controlling PoC Server sends a Diameter ACR to Prepaid System A.

The Diameter ACR includes:
Accounting-Record-Type=INTERIM_RECORD
Subscription-Id (Type=END_USER_SIP_URL, Data='user-A SIP URI')
M-S-C-C
   Service-Parameter-Info (Type=ExtensionNumber1, Value=POC_INSTANT_PERSONAL_TALK)
   Service-Parameter-Info (Type=ExtensionNumber2, Value=session–owner)
   Requested-Service-Unit
     (Type=SERVICE_CREDIT_EVENT, Value='pre-configured value')
   Used-Service-Unit (Type=SERVICE_CREDIT_EVENT, Value='amount of used service units')
   Service-Parameter-Info (Type=ExtensionNumber2, Value=e.g. "number of distributed talk bursts")

6. Prepaid System-A deducts the used amount from the end-user's account, rates the service based on the contents of the received Service-Parameter-Info, makes a new credit-reservation from the end-user's account (that covers the cost of the service) and returns a Diameter ACA. For the purpose of this scenario the user's credit balance is sufficient. The Diameter ACA includes:
Result-Code=DIAMETER_SUCCESS
Accounting-Record-Type=INTERIM_RECORD
Accounting-Interim-Interval ('value set by the Prepaid System')
Subscription-Id (Type=END_USER_SIP_URL, Data='user-A SIP URI')
M-S-C-C
   Service-Parameter-Info (Type=ExtensionNumber1, Value=POC_INSTANT_PERSONAL_TALK)
   Service-Parameter-Info (Type=ExtensionNumber2, Value=session–owner)
   Granted-Service-Unit
     (Type=SERVICE_CREDIT_EVENT, Value='Prepaid System sets Granted-Service-Unit value Requested-Service-Unit value')
   Service-Parameter-Info (Type=ExtensionNumberC, Value=e.g. "number of distributed talk bursts")

7. The Controlling PoC Server A continues monitoring the usage of the granted-service-units.

8. Controlling PoC Server A sends a SIP 202 Accepted to UE A, via IMS Core A.

9. Controlling PoC Server A sends a SIP INVITE (SDP Offer 2) to Participating PoC Server B. It will be appreciated that this message can be sent immediately by the PoC Server A, following receipt of the SIP REFER message from UE A, i.e. this message may be sent before or during the exchange of DIAMETER messages (5 and 6).

10. The Participating PoC Server B gets (from GLMS functionality) the Do-not-Disturb flag, the access (accept/reject) lists, and the answer mode of the invited user. The Participating PoC Server B authorizes the request based on the Do-not-Disturb flag and the access (accept/reject) lists of the invited user. For the purpose of this scenario, the Participating PoC Server B determines that the DnD flag is not set, the inviting user is not on the reject list, and the invited user's answer mode is set to "auto answer".

Charging in Network-B, Intermediate Interrogation

11. The participating PoC Server performs an intermediate interrogation to provide new/additional rating input to Charging System A, i.e. the Participating PoC Server now has knowledge of terminating PoC session.

12. The Participating PoC Server sends a Diameter ACR to Prepaid System B.

The Diameter ACR includes:
Accounting-Record-Type=INTERIM_RECORD
Subscription-Id (Type=END_USER_SIP_URL, Data='user-A SIP URI')
M-S-C-C
  Service-Parameter-Info (Type=ExtensionNumber1, Value=POC_ANY_TALK_SESSION)
  Service-Parameter-Info (Type=ExtensionNumber2, Value=session–participant)
  Requested-Service-Unit (Type=SERVICE_CREDIT_EVENT, Value='pre-configured value')
  Used-Service-Unit (Type=SERVICE_CREDIT_EVENT, Value='amount of used service units')
  Service-Parameter-Info (Type=ExtensionNumberBB, Value="sent talk burst")

13. Prepaid System-B deducts the used amount from the end-user's account, rates the service, based on the contents of the received Service-Parameter-Info, makes a new credit-reservation from the end-user's account (that covers the cost of the service) and returns a Diameter ACA. For the purpose of this scenario the user's credit balance is sufficient. The Diameter ACA includes:
Result-Code=DIAMETER_SUCCESS
Accounting-Record-Type=INTERIM_RECORD
Accounting-Interim-Interval ('value set by the Prepaid System')
Subscription-Id (Type=END_USER_SIP_URL, Data='user-A SIP URI')
M-S-C-C
  Service-Parameter-Info (Type=ExtensionNumber1, Value=POC_ANY_TALK_SESSION)
  Service-Parameter-Info (Type=ExtensionNumber2, Value=session–participant)
  Granted-Service-Unit (Type=SERVICE_CREDIT_EVENT, Value='Prepaid System sets Granted-Service-Unit value=Requested-Service-Unit value')
  Service-Parameter-Info (Type=ExtensionNumberBB, Value="sent talk burst")

14. The Participating PoC Server B starts monitoring the usage of the granted-service-units.

Connection Set-Up with Early Session Proceeds

15. UE-B has an established early session and has auto answer mode set; thus, the Participating PoC Server B selects early media mode.

16. Participating PoC Server B sends a SIP 200 OK (SDP Answer 2) to Controlling PoC Server.

17. SIP ACK is sent from Controlling PoC Server A to Participating PoC Server B. It is noted that, as with the SIP INVITE message (9), the sending of the SIP ACK and SIP 200 OK messages is independent of the exchange of DIAMETER messages (5,6,12,13).

18. Controlling PoC Server sends RTCP "floor taken" to UE B, via Participating PoC Server B.

19. A "listening indication" is given to user B.

20. Controlling PoC Server sends RTCP "floor granted" to UE A. It is noted that, as with the SIP INVITE message (9), the sending of the messages RTCP "floor taken" (18) and RTCP "floor granted" (20) is independent of the exchange of DIAMETER messages (5,6,12,13).

21. A "talk indication" is give to user A (both "SIP 202 Accepted" carrying the SDP Answer, and "RTCP floor granted" indicating that PoC Server is ready to handle media, are needed for user interaction purposes).

User A Begins Talking

22. User A starts to talk.

23. "RTP talk burst" (media) is transmitted from UE A to UE B, via Controlling PoC Server and Participating PoC Server B.

24. User A listen to user B's speech phrase.

25. Due to previous "implicit subscription to invited user status" upon receipt of SIP 200 OK, the Controlling PoC Server sends a SIP NOTIFY request to IMS Core A. IMS Core A sends the SIP NOTIFY to UE A. The SIP NOTIFY includes:
Event=refer
Message body with Content Type "message/sipfrag" containing:
  The status line of the SIP response that the PoC Server received from the invited user, "SIP/2.0 200 OK" for this scenario; and
  The Public User Identity of the invited user (SIP URI or MSISDN).

26. UE A sends a SIP 200 OK response to the SIP NOTIFY to IMS Core A. IMS Core A sends the SIP 200 OK to Controlling PoC Server.

User A Ends Talking

27. User A releases the PoC button.

28. UE A sends "RTCP floor release" to Controlling PoC Server.

29. Controlling PoC Server sends "RTCP floor Idle" to UE A.

30. Controlling PoC Server sends "RTCP floor Idle" Participating PoC Server B, which forwards it to UE B.

31. A "floor idle indication" is given to user B.

More Talk-Bursts may be Sent/Received by User-A and User-B

Other talk bursts may be sent/received by user-A and user-B. Other credit-control intermediate interrogation may occur.

User-A Disconnects from the Talk Session

32. User-A requests to disconnect from the talk session.

33. UE-A sends a "RTCP BYE" to Controlling PoC Server.

34. Controlling PoC Server detects inactivity timer expiry. According to the session termination policy the Controlling PoC Server requests talk session release.

35. Controlling PoC Server sends "RTCP BYE" to Participating PoC Server B, which forwards it to UE-B.

36. A session disconnect indication is given to user B.

37. Controlling PoC Server sends a SIP BYE to Participating PoC Server B.

38. Participating PoC Server B responds with SIP 200 OK (for SIP BYE).

Charging in Network-A, Final Interrogation

39. The Controlling PoC Server sends a Diameter ACR to Prepaid System A.

The Diameter ACR includes:
Accounting-Record-Type=STOP_RECORD
Subscription-Id (Type=END_USER_SIP_URL, Data='user-A SIP URI')
Used-Service-Unit (Type=SERVICE_CREDIT_EVENT, Value='amount of used service units')

40. Prepaid System-A returns a Diameter ACA. For the purpose of this scenario the user's credit balance is sufficient. The Diameter ACA includes:
Result-Code=DIAMETER_SUCCESS
Accounting-Record-Type=STOP_RECORD
Charging in Network-B. Final Interrogation 41. The Participating PoC Server sends a Diameter ACR to Prepaid System B.

The Diameter ACR includes:
Accounting-Record-Type=STOP_RECORD
Subscription-Id (Type=END_USER_SIP_URL, Data='user-A SIP URI')
Used-Service-Unit (Type=SERVICE_CREDIT_EVENT, Value='amount of used service units')

42. Prepaid System-B returns a Diameter ACA. For the purpose of this scenario the user's credit balance is sufficient. The Diameter ACA includes:
Result-Code=DIAMETER_SUCCESS
Accounting-Record-Type=STOP_RECORD It will be appreciated from the above discussion that the introduction of the prepaid feature (a must for wide market acceptance of certain PoC features) is done in such a way that the credit authorization phase does not influence the PoC talk session set-up time. The IPMM Serving Element (e.g. PoC Server) performs credit authorization towards the Prepaid System to reserve credit, at some time after initial IMS user registration as part of the "PoC early session procedure"; that is before the actual set-up time critical PoC service feature (i.e. Instant Personal talk, Ad-hoc Instant Group Talk) is invoked by the end-used. When the end-user invokes the PoC service feature, the IPMM Serving Element can process the service request immediately by relying on the previously reserved credit; at the same time the IPMM Serving Element performing a second credit authorisation to provide the Prepaid System with refined rating input (e.g. the actual PoC feature invoked, the role of the session originating party). As a result, the credit authorization phase does not influence the PoC talk session set-up time.

It will be appreciated by the person of skill in the art that various modifications may be made to the above described embodiments without departing from the scope of the present invention.

APPENDIX

Push-to-Talk over Cellular (PoC) is a "walky-talky" type of service based on IMS technology. The PoC service includes the following features:

Instant Personal Talk

This is a (1-to-1) voice communication with another user, where the users talk one at a time. A user invites the other user to establish an Instant Personal Talk session. A participating user of the 1-to-1 Instant Personal Talk service may add a new user or users to the session, thus establishing a 1-to-N communication (i.e. Ad-hoc Instant Group Talk).

Chat Group Talk

This is a 1-to-N voice communication, where the users speak one at a time. A user joins the group in order to participate in the chat group talk, i.e. each participant joins the session individually. There are two types of chat groups:

1. An open chat group is a group that can be joined-in by any user
2. A restricted chat group is a group with member list; only the user who owns the group is able to add and remove group members; only the group members are able to join the chat group talk session A group has to be created and the members have to be defined before a Restricted Chat Group Talk can be established. A group has to be created before an Open Chat Group Talk can be established. A participant in an ongoing open or restricted chat group talk session may add/invite other users to the session; if the group is restricted, a participant may invite only users who are members of the group.

Instant Group Talk

This is a 1-to-N voice communication, where the users speak one at a time. One of the members of the group invites all other group members to the instant group talk session. A group has to be created and the members have to be defined before an Instant Group Talk can be established. A member of the group who has left the group or has initially rejected the invitation, may join/re-join an ongoing instant group talk session. A participant to an ongoing instant group talk session may add/invite other members of the group to the session.

Ad-hoc Instant Group Talk

This is a 1-to-N voice communication, where the users speak one at a time. A user invites selected users to an Ad-hoc Instant Group Talk session. A participant to an ongoing ad-hoc instant group talk session may add/invite other users to the session. A user who has left the group or has initially rejected the invitation, may join/re-join an ongoing ad-hoc instant group talk session.

Instant Personal Alert

A user may alert another user. The alert express the user's wish to communicate and it is way to politely request the other user to call back using for example the instant personal talk feature. An instant personal alert may carry a text message.

In addition, the following capabilities are used in association with the PoC features described above:

Group and List Management

This allows PoC end-users (and operators) to manage group, lists and other information, as described below. The information is stored in the network in the Group and List Management Server (GLMS) logical entity, and managed via the UE-GLMS interface.

Contact Lists

These are used for storing contact entries (individuals and group) in the UE and the network. Such lists be used by the UE to address users and groups when initiating PoC communication. Contact lists apply to Instant Personal Talk and Ad-hoc Instant Group Talk session types.

Access (Accept/Reject) Lists

These are used to define access rules; that is who is allowed or not allowed to reach a specific user via PoC services (i.e. a called/invited user may use accept and reject lists to accept or reject incoming talk session requests from other users). Access lists apply to all talk session types, and are used by the PoC Server. This is a called/terminating party feature.

Group Lists

Group lists are used to define PoC specific groups, and apply to open/restricted Chat Group Talk and Instant Group Talk. Used by the PoC Server and the UE.

Do-not-Disturb (DnD)

The called/invited user may use the "Do Not Disturb" feature the block all incoming talk sessions (expect Instant Personal Alert). DnD takes precedence over the Access Lists. Used by the PoC Server. This is a called/terminating party feature.

Answer Mode

The called/invited user may select auto or manual answer modes, and are used by the PoC Server and the UE. It is a called/terminating party feature. The PoC Server serving the invited user may use the answer mode to select the media mode (early or late media) for the session.

Presence

This feature is used to advise parties of the accessibility of other parties.

The invention claimed is:

1. A method of providing an IP Multimedia service to a mobile subscriber, the method comprising:
   registering the mobile subscriber to the IP multimedia service;
   prior to receiving a request to invoke the IP Multimedia service, utilizing an early session establishment procedure to reserve an estimated credit amount at a charging control node and to notify an IP Multimedia Serving Element of the estimated credit reservation, the estimated credit amount based on a charging rate for a preconfigured IP Multimedia service;
   upon receiving a request to invoke an actual IP Multimedia service, the IP Multimedia Serving Element proceeding immediately to establish a session of the actual IP Multimedia service by relying on the estimated credit reservation made by the early session establishment procedure;
   updating the credit reservation based on a charging rate of the actual IP Multimedia service invoked by the mobile subscriber, when the charging rate of the actual IP Multimedia service is different from the charging rate of the preconfigured IP Multimedia service; and
   notifying the IP Multimedia Serving Element of the updated credit reservation.

2. The method according to claim 1, wherein the early session establishment procedure comprises an exchange of messages between the IP Multimedia Serving Element and the charging control node using a DIAMETER based protocol.

3. The method according to claim 1, wherein the early session establishment procedure is triggered automatically following registration of the subscriber to the IP multimedia service.

4. The method according to claim 1, wherein the early session establishment procedure is triggered by the subscriber activating the IP multimedia service.

5. The method according to claim 1, wherein the IP Multimedia service is a Push-to-talk over Cellular IP Multimedia service.

6. The method according to claim 1, wherein said subscriber is a prepaid subscriber and said charging control node is a prepaid system server located in the subscriber's home network.

7. A method of operating an IP Multimedia Serving Element to enable immediate invocation of an IP Multimedia service upon request, the method comprising:
   following initial registration of a subscriber to the IP Multimedia service, and prior to receiving a request to invoke the IP Multimedia service, initiating a transaction with a charging control node as part of an early session establishment procedure to reserve an estimated credit amount at the charging control node, the estimated credit amount based on a charging rate for a preconfigured IP Multimedia service;
   upon receiving the request to invoke an actual IP Multimedia service, proceeding immediately to establish a session of the actual IP Multimedia service by relying on the estimated credit reservation made by the early session establishment procedure;
   updating the credit reservation based on a charging rate of the actual IP Multimedia service invoked by the subscriber, when the charging rate of the actual IP Multimedia service is different from the charging rate of the preconfigured IP Multimedia service; and
   notifying the IP Multimedia Serving Element of the updated credit reservation.

8. A method of operating a charging control node arranged to control subscriber access to IP Multimedia services, the method comprising:
   estimating in an early session establishment procedure, a credit amount to be reserved for a future session, wherein the estimated credit amount is based on a charging rate of a preconfigured IP Multimedia service, and wherein the early session establishment procedure follows initial registration of a subscriber to an IP Multimedia service but precedes invocation of the IP Multimedia service;
   reserving the estimated credit amount;
   notifying an IP multimedia Serving Element of the estimated credit reservation to enable the IP multimedia Serving Element to immediately proceed with establishment of a session of the IP Multimedia service upon request, by relying on the estimated credit reservation made by the early session establishment procedure;
   updating the credit reservation based on a charging rate of an actual IP Multimedia service invoked by the subscriber, when the charging rate of the actual IP Multimedia service is different from the charging rate of the preconfigured IP Multimedia service; and
   notifying the IP Multimedia Serving Element of the updated credit reservation.

* * * * *

UNITED STATES PATENT AND TRADEMARK OFFICE
CERTIFICATE OF CORRECTION

PATENT NO. : 8,150,369 B2  
APPLICATION NO. : 11/569822  
DATED : April 3, 2012  
INVENTOR(S) : Bellora et al.

Page 1 of 1

It is certified that error appears in the above-identified patent and that said Letters Patent is hereby corrected as shown below:

On the Title Page, in Field (75), under "Inventors", in Column 1, Line 3, delete "Munoz," and insert -- Muñoz, --, therefor.

On the Title Page, in Field (87), under "PCT Pub. No.", in Column 1, Line 1, delete "WO2005/120034" and insert -- WO2005/120039 --, therefor.

In Column 1, Line 11, delete "TO THE" and insert -- OF THE --, therefor.

In Column 5, Line 49, delete "(NB." and insert -- (NB, --, therefor.

In Column 6, Line 31, delete "up"" and insert -- up") --, therefor.

In Column 6, Line 41, delete "bursts"" and insert -- bursts") --, therefor.

In Column 6, Line 51, delete "burst"" and insert -- burst"). --, therefor.

Signed and Sealed this  
Tenth Day of July, 2012

David J. Kappos  
*Director of the United States Patent and Trademark Office*